United States Patent [19]

Keskitalo

[11] Patent Number: 5,345,448
[45] Date of Patent: Sep. 6, 1994

[54] PROCEDURE FOR THE HANDOVER OF A RADIO CONNECTION

[75] Inventor: Ilkka Keskitalo, Halikko, Finland

[73] Assignee: Nokia Mobile Phones Ltd., Salo, Finland

[21] Appl. No.: 52,779

[22] Filed: Apr. 26, 1993

[30] Foreign Application Priority Data

Apr. 27, 1992 [FI] Finland .................................. 921882

[51] Int. Cl.$^5$ .......................................... H04B 7/212
[52] U.S. Cl. ..................................... 370/95.3; 379/60; 455/33.2; 375/12
[58] Field of Search ..................... 455/33.1, 33.2, 33.3, 455/51.1, 54.2, 56.1; 379/59, 60; 370/29, 71, 95.1, 95.3, 14, 12

[56] References Cited

U.S. PATENT DOCUMENTS

| 5,042,082 | 8/1991 | Dahlin | 455/33.2 |
| 5,081,679 | 1/1992 | Dent | 455/33.2 |
| 5,241,688 | 8/1993 | Arora | 370/95.3 |
| 5,247,401 | 10/1993 | Dahlin et al. | 379/60 |

FOREIGN PATENT DOCUMENTS

| 0214319A1 | 3/1987 | European Pat. Off. |
| 0324508A2 | 7/1989 | European Pat. Off. |
| 0448015A2 | 9/1991 | European Pat. Off. |
| 0474138A2 | 3/1992 | European Pat. Off. |

Primary Examiner—Benedict V. Safourek
Attorney, Agent, or Firm—Perman & Green

[57] ABSTRACT

In a digital Time Division Multiple Access radio communications network that includes a number of Base Transceiver Stations, and several Mobile Stations, a handover can be accomplished so that the parameters required in identifying a Mobile Station, and the frequency data, the data of the time interval to be used, as well as the frame number data of the channel are given to a new Base Transceiver Station to which a Mobile Station will be moved. The new Base Transceiver Station is tuned to listen to the channel determined by the data it received. The former Base Station transmits a handover command to the Mobile Station containing the frequency data, the data of the time interval to be used, as well as the frame number data of the channel to which the new Base Station has moved. After the command the Mobile Station turns the trafficing directly to said channel. The timing measurements between the Base Station and the Mobile Station are not required and any tuning correction is carried out by the channel equalizer.

9 Claims, 2 Drawing Sheets

PROCEDURE FOR THE HANDOVER OF A RADIO CONNECTION

The present invention relates to a procedure for the handover of a radio connection between two base stations in a radio communications network.

BACKGROUND OF THE INVENTION

The present invention particularly relates to a handover operation in a Time Division Multiple Access (TDMA) digital cellular radio communication system comprising a plurality of Base Transceiver Stations (BTS), and a number of Mobile Stations (MS).

Analog mobile phone systems have long been available, the basic notion thereof being that a network is composed of a plurality of mutually defined cells, each provided with a Base Station in which the transmission power covers the range of said cell, but scarcely extending to the range of an adjacent cell. The system also includes Mobile Services Switching Centers, with each of which being connected a great number of Base Stations. In addition, the system includes a plurality of mobile phones, usually called Mobile Stations (MS), so that a connection can be formed between two mobile phones or between a subscriber connected to the Public service telephone network (PSTN) and a mobile phone. Said networks are frequency divided, whereby one connection always engages two frequencies. The completely digital systems based on TDMA represent the next step of development in mobile phone systems in which the same frequency is used in several connections but at different periods of time. Of such systems may be mentioned the GSM currently being adopted into use in Europe and the digital cellular system to be used in the USA.

In all cellular networks measures have to be taken in one way or another to enable a mobile phone to move from one channel to another during a call without breaking the connection. A channel change, i.e. handover, can be intracellular, whereby the movement is made from one channel or time interval to another while remaining within one Base Transceiver Station, or intercellular, so that the connection changes to another Base Transceiver Station, this being subjected to either the same Base Station Controller or the Base Transceiver Station is subjected to a second Base Station Controller. Potential cases are shown in FIG. 1 illustrating the principle block diagram of a typical digital system. As shown therein, several Base Station Controllers BSC have been connected to a Mobile services switching centre MSC, each controlling a number of Base Transceiver Stations BTS. Each BSC together with the Base Stations connected thereto makes up a Base Station System BSS in which the control of a cellular network has been concentrated in the BSC.

A connection with other networks, such as the PSTN, is carried out through MSC. The handover can be made intracellularly, whereby a Mobile Station MS is in connection with one and the same Base Station (e.g. BTS 1) but it changes the frequency or the time interval of the trafficking channel if the level of interference on a certain channel has become too great. The handover decision is usually made in the BSC. Said intracellular handover is indicated by a. When changing a connection from one Base Transceiver Station (e.g. BTS 1) to another Base Transceiver Station (e.g. BTS 2) subjected to the same Base Station controller, the handover decision is made also in the BSC 1. Said move is illustrated by arrow b. A connection may also be moved as shown by arrow c from a Base Transceiver Station (e.g. BTS 3) to a Base Transceiver Station (e.g. BTS 21) subjected to another Base Station Controller (e.g. BSC 2). Now, the control of the move is carried out by the Mobile Services Switching Center (MSC).

A great number of measures are required in carrying out a perfect handover in prior art digital time divided radio phone systems. A Mobile Station MS must measure, not only the signal strength of the Base Station to which it is connected but also those of the adjacent Base Stations and to transmit measuring results to the Base Transceiver Station BTS in use at that moment. The Base Station transmits the data to an MSC which makes the decision on which Base Transceiver Station the call is to be transferred. In addition to measurements concerning the signal strengths of the adjacent Base Stations, the mobile station is required from time to time to discharge a given burst transmitted by the adjacent Base Stations, on the basis of which the telephone calculates the timing difference between the Base Station to which is connected and the timings of the adjacent Base Stations using the parameters derived from said Base Stations. Similarly, the frame number difference between the Base Stations in use own and the adjacent Base Stations has to be calculated.

Also the timing of starting a transmission detected by the Base Station has to be taken into account so that the synchronization with the Base Station can be maintained while the Mobile Station is moving at a long distance from the Base Station.

As a result of the measurements carried out by the Mobile Station and the Base Station, the mobile phone network determines the handover moment and to which new Base Station the connection is going to be moved. All of said operations related to the handover between the MSC, the BTSs and the Mobile Station MS require a great number of signalling and signal processing operations in the network. Therefore, in digital networks known in the art the handover operation is bound to be rather complicated and heavy.

In TDMA systems of prior art, the multiple access propagation of a signal in a radio channel is seen in the form of mutual influence between the detected bits, and the changing timing causes variations in the reception. The receivers are required to be able to correct said time-related variations produced in a radio channel over the length of several symbols, e.g. in the GSM system reservations have been made to correct delay dispersions up to 16 microseconds.

A procedure is disclosed for enabling a handover to be carried out simply in a digital, TDMA cellular system.

The handover according to the present invention can be applied to a TDMA cellular network as described above.

SUMMARY OF THE INVENTION

According to the present invention there is provided a procedure for the handover of a radio connection to a mobile radio station from a first base station to a second base station in a Time Division Multiple Acess (TDMA) cellular radio communications network the procedure comprising, transmitting to the second base station identification information regarding the mobile station including frequency channel information enabling tuning of the second base station to the channel in which the mobile station shall transmit, transmitting to the mobile station a handover command not including information on the timing of the second base station, and correcting for deviation in signal timing caused by a change in timing during handover.

A difference between the invention and the systems known in the art is therefore that the measurements of the timing data of the adjacent cells in the downlink direction (BTS→MS) is not required. A first basic prerequisite of a simplified handover is the propagation delays between an MS and a BS are not too great in relation to time. This means that the sum of the maximum delay dispersion of the radio channel defined for the network, through which a Mobile Station has to be able to pass, and of the greatest possible change in timing (timing difference) must be smaller than the correction ability required of the Mobile Station MS in the time level.

The maximum timing of the change is determined by the difference in cell sizes. A channel equalizer to correct the dispersion in the time level is needed both in the Base Station and in the Mobile Station. The capacity of the channel equalizer is sufficient to correct the mutual effect caused by the multipath propagation and the variations due to timing. Another basic prerequisite set for the network is that the timing differences of the Base Stations must be known, i.e. a Base Station must be informed of the difference of its own timing in comparison with the timings of the adjacent Base Stations. If the timing of the Base Stations is gliding relative to the other ones, the information on a change has to be updated.

A timing difference may also be kept at zero, whereby the clocks of the Base Stations are at the same phase. An adequate measuring required of a Mobile Station MS is that it is able to measure the signal level of the adjacent Base Transceiver Stations according to an adjacent list. Said adjacent list has been transmitted by the Base Transceiver Station of its own via a common control channel. The Base Transceiver Station BTS informs the Mobile Station MS subjected to the handover command of the frequency, the time interval to be used, (timing difference), and the frame number of the new Base Transceiver Station. Said information and the parameters required in identifying the Mobile Station are also given to the new Base Transceiver Station which is immediately prepared to receive a signal used in a normal traffic channel without any special bursts used e.g. in the GSM system. Most simply, in a handover situation the MS is merely turned into a new channel and it starts normal trafficking directly.

A decision on a handover is made, depending on the situation, either in the Base Station Controller BSC or in the Mobile Services Switching Center MSC, although the decision making element is not essential from the point of view of the handover process of the invention.

BRIEF DESCRIPTION OF THE DRAWINGS

An embodiment of the invention is described below, by way of example, with reference to the accompanying drawings; in which FIG. 1 schematically presents different handover cases.

DETAILED DESCRIPTION OF THE INVENTION

Figure 1:
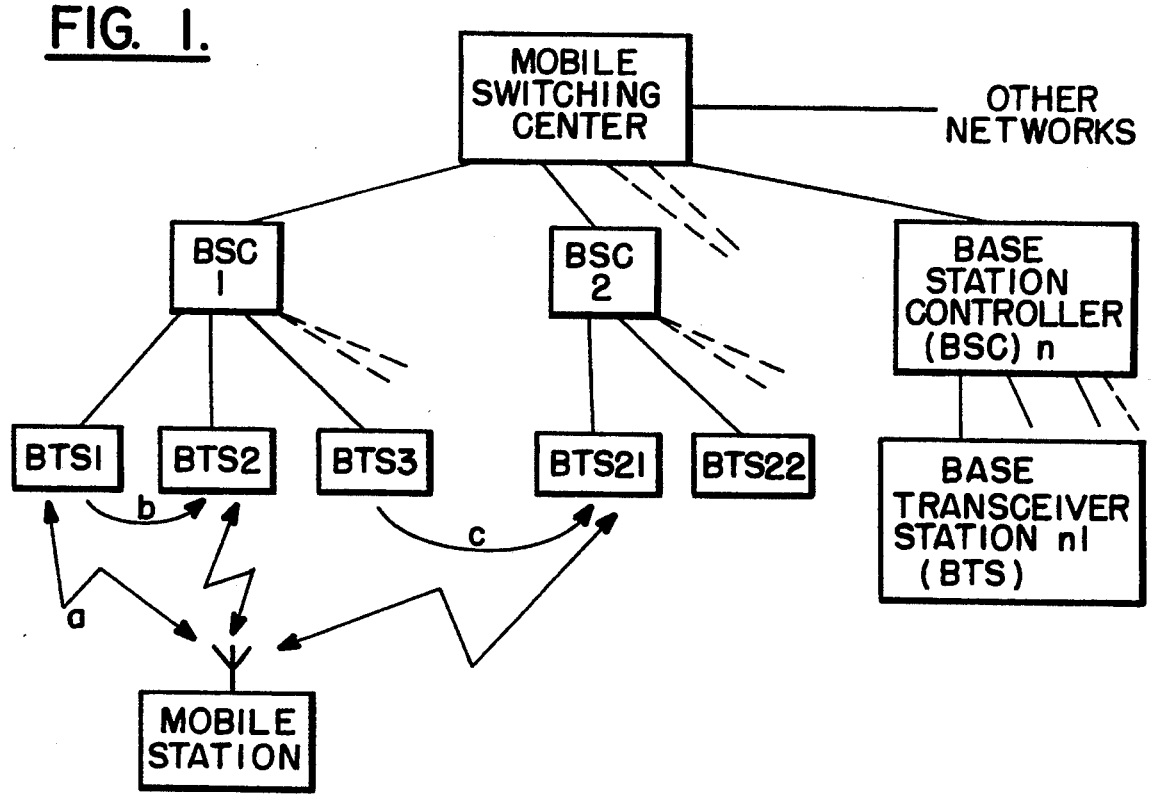
Figure 2:
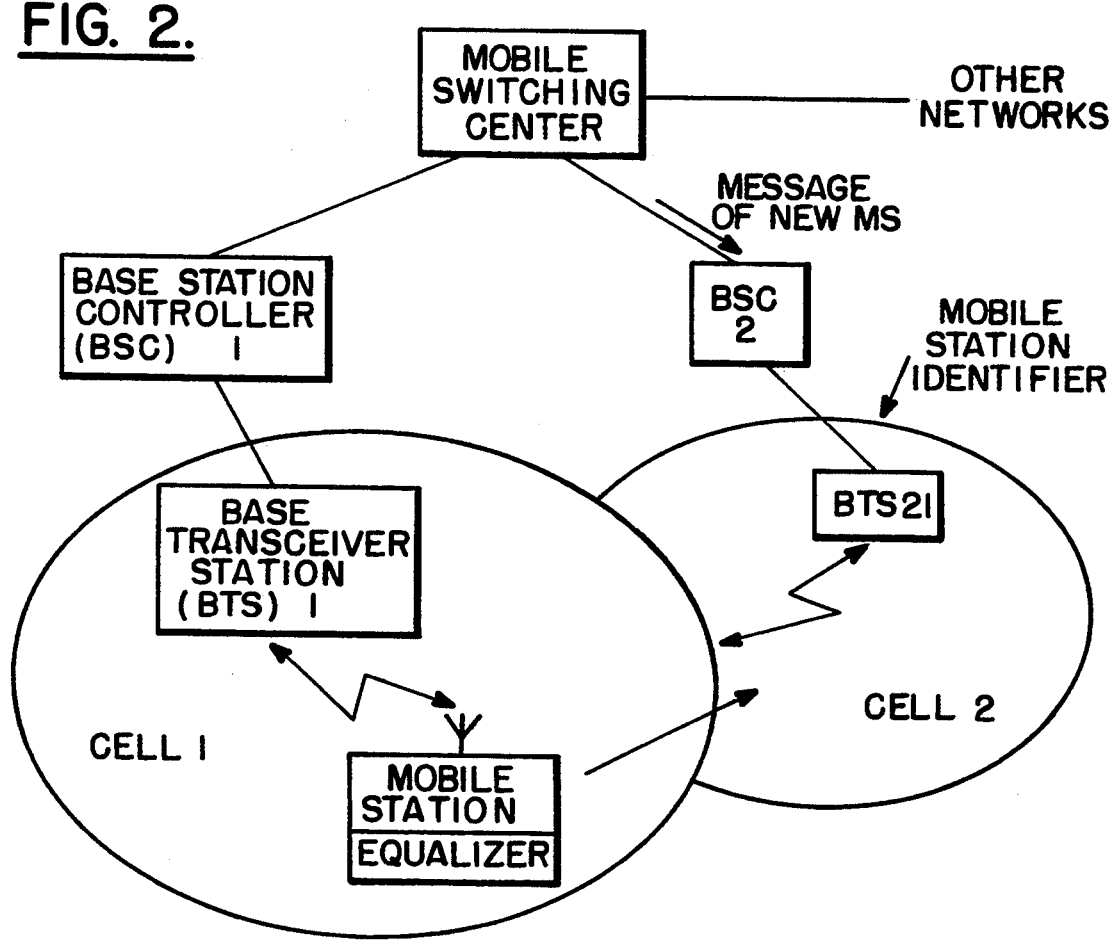
FIG. 2 illustrates part of a network provided with two cells and a Mobile Services Switching Center.

FIG. 2 shows two adjacent cells 1 and 2. Each cell is provided with a Base Transceiver Station BTS 1, resp.BTS 2. In this example, the Base Transceiver Stations have been connected to a controller of another Base Transceiver Station, BTS 1 to controller BSC 1, and BTS 2 to controller BSC 2, respectively. The controllers have been connected to an MSC which in addition to the controllers described controls a plurality of other Base Station Controllers. In a network used in the present invention, the timing difference between the Base Transceiver Stations BTS 1 and BTS 2 should be known. This is made feasible in that the network is entirely synchronous or at least partly synchronous.

An assumption is made in FIG. 2 first that a traffic connection exists between an MS and a Base Transceiver Station BTS 1. The Base Station BS 1 measures the signal power of MS during the connection and reports of it to the MSC when a handover is to be expected to a Base Transceiver Station subjected to a Base Station Controller BSC 2. In another instance the information is transmitted to the Base Station Controller BSC 1. The Mobile Station MS measures, according to the adjacent Base Station list received, periodically also the signal of the adjacent Base Station BSC 2 and reports BTS 1 thereof.

When the handover criterion is met, a report is signalled to Base Station Controller BSC 2 containing the parameters required in identifying an MS, and information about the frequency channel $f_2$, the new time interval $t_{xs2}$ to be used, as well as the new frame number $FN_2$. The controller guides the new Base Station BTS 2 to the channel directed by said information, and it is prepared to receive the incoming transmission from the MS. Thereafter, the MSC gives a command to the Base Station controller BSC 1 to control the Base Transceiver Station BTS 1 to transmit a handover command to MS containing said information already transmitted to Base Station BS2 about the new frequency channel $f_2$, the new time interval $t_{xs2}$ to be used, and the new frame number $FN_2$. Also the timing difference data between the Base Transceiver Stations is transmitted if the stations are not synchronized.

After receiving a handover command the MS sets the parameters (frequency, time interval, frame number) to correspond to the new location presented in the command, moves to a new channel and starts trafficking immediately, as well as delivers its identification data to a new Base Station BS2 which the new Base Station compares with the data provided by the MSC. In this manner the handover operation can be carried out very simply and rapidly.

Figure 3:
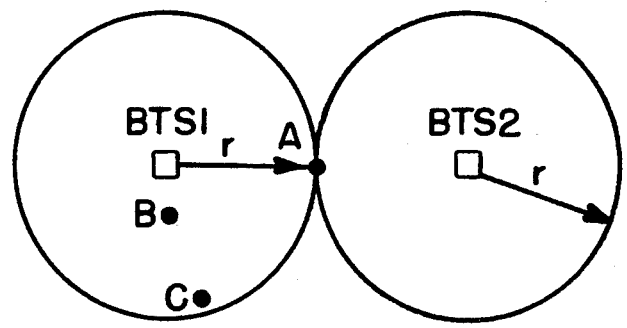
FIG. 3 illustrates different delay instances related to a channel corrector.

The basic insight of the invention is to utilize the delay processing ability of the channel equalizer of the receiver to correct both the errors caused by the radio channel and the deviation caused by a change of the timing in a handover situation. The significance of the propagation delay and the delay dispersion regarding the channel corrector is illustrated in FIG. 3. The circles describe cells in the middle of which a Base Transceiver Station BTS 1 and BTS 2 are provided. For the sake of simplicity, the radius r of the cells is assumed to be the same. The following aspects are first defined:

$t_1$ = the correction ability of the MS required in the system in the time level. This means variation of the reception point of time of a signal caused by a change of the timing and the delay profile.

$t_2$ = the maximum delay dispersion of the radio channel determined for the network through which the Mobile Station has to pass. It is a given constant.

$t_3$ = the maximum change of timing when moving from a Base Station to another. This value changes when the location of MS changes.

Such situations are examined in which the MS is in point A, point B and point C. When MS is in point A, $t_3 = 0$ is true because the distance to both Base Stations is the same. In point B, in which the MS is located adjacent to BTS 1, $t_3$ is the time which the radio waves take when travelling between the Base Stations, i.e. $t_3 = 2r/c$, where c speed of light. As regards the handover, point B is difficult, but in practice no handover is carried out in this point, neither in point C. In point C the value of $t_3$ lies somewhere between the values stated above. Thus, in points A and B the extreme values relative to $t_3$ are obtained. According to the definitions the following details must become true:

$$t_1 >= t_2 + t_3.$$

When $t_1$ and $t_2$ are those given in the system, it is found that at the same time they determine the maximum cell size of the network for the inequality to be true. In the reception of the Base Station the value of $t_3$ can be considerably higher than in the reception of MS described above; therefore, the performance of the Base Station receiver has to meet higher requirements in this sense.

Figure 4:
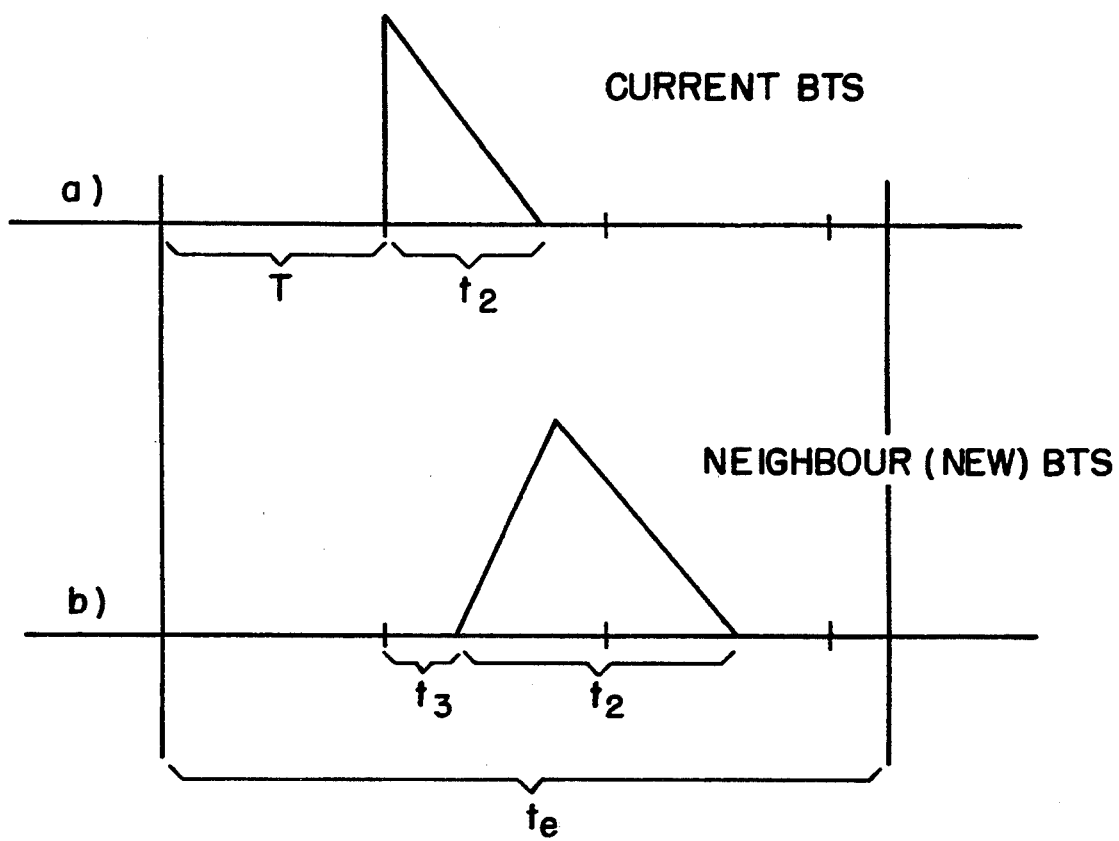
FIG. 4 shows the effect caused by a change in timing and by delay dispersion of a radio channel on a signal received.

In FIGS. 4a and 4b an example is presented on the general principle of FIG. 3. Therein FIG. 4a, topmost, illustrates the impulse response of the channel in receiving a transmission from the Base Station BS1 of its own (or when the Base Station is receiving from MS). On the time axis, the space between two signs is the duration T of the symbol to be transmitted, dependent on the modulation speed and $t_2$ is the length of the delay dispersion of the radio channel between its own Base Station BS1 and MS. The effect of said delay dispersion can easily be corrected with the channel corrector. The maximum time dispersion permitted by the channel corrector is marked with $t_e$. The delay components should be kept within said time dispersion also when moving to a new Base Station. The lower FIG. 4b is a corresponding presentation when the radio channel is placed between an adjacent Base Transceiver Station BTS 2 and the MS but the MS is within the timing of BTS 1. Now, $t_2$ refers to the delay dispersion between MS and BTS 2. There is a timing difference $t_3$ between the Base Stations, whereby the energy of the delay dispersion of the received symbol is visible in triangle form on the radio channel between Base Station BS2 and MS during the time $t_2$. The delay profiles (i.e. triangles) are merely idealized assumptions, and the difference between the triangles illustrates only the fact that the radio channel can be different in the direction of different Base Stations. In practice the profiles can be highly indefinite. Let it be also mentioned that e.g. at bit speeds used in the GSM system, the duration of a symbol is equivalent to about one kilometer when presented as propagation distance. A cell of the size of one kilometer is already big e.g. in a cordless telephone network, and the delay dispersion need not necessarily be limited even to one symbol period, as is shown in FIG. 4a and b.

In the description of the invention as the one disclosed above, no attention is paid to the way of how the signalling is carried out between MS, BSC, BTS and the Mobile Services Switching Center. In the method of the invention the signalling need is small and, depending on the cellular telephone system applied, the channels and protocols used therein are applied in signalling. As is well known in the art, the identification of the MS can be transmitted with a contact specific control channel. If for one reason or another the signalling messages do not run between the telephone set and the Base Transceiver Stations, the telephone may try to return to the former channel, and if not even that attempt is successful, the call is interrupted.

The handover procedure simplifies the handover operation. A search of the synchronizing data from a Base Transceiver Station is not necessary, neither any heavy measuring and timing definition routines related thereto. When accomplishing a handover, nothing but the frequency, time interval, frame number data presented above are needed from the new Base Transceiver Station. For these reasons, the handover is rapid, and it has been simplified into a move from one channel to another. It is accomplished without any intermediate steps. The trafficing can be started directly via a new Base Station which has through the network been instructed to start listening to the MS moving thereon.

In view of the foregoing it will be clear to a person skilled in the art that modifications may be incorporated without departing from the scope of the present invention.

I claim:

1. A procedure for the handover of a radio connection to a mobile radio station from a first base station to a second base station in a Time Division Multiple Access (TDMA) cellular radio communications network having a controller coupled to the first base station and to the second base station, the procedure comprising:

transmitting from the controller to the second base station identification information regarding the mobile station, the identification information including frequency channel information enabling tuning of the second base station to a channel in which the mobile station shall transmit:

transmitting from the controller, through the first base station, a handover command to the mobile station that does not include information describing timing characteristics of the second base station; and in response to the mobile station establishing communication with the second base station, correcting with a channel equalizer for any deviation in signal timing caused by a change in timing during handover.

2. A procedure as claimed in claim 1, wherein the mobile station identification information transmitted to the second base station and the handover signal transmitted to the mobile station both include the channel frequency information, and information regarding the time interval and frame number of the channel to which the mobile station is to be moved as a result of the handover.

3. A procedure as claimed in claim 1, and further including a step of initiating trafficking with the mobile station immediately after the mobile station moves to the new channel as a result of the handover.

4. A procedure as claimed in claim 1, wherein the step of correcting utilizes the channel equalizer to correct received symbol timing that results from both timing errors caused by the radio channel and from any deviation caused by a change in the timing during handover between the first base station and the second base station.

5. A procedure as claimed in claim 1, and including a preliminary step of informing the second base station of a timing difference between the first and second base stations.

6. A procedure as claimed in claim 5, wherein the timing difference is known by the second base station because the first and second base stations operate as part of a network which is at least partly synchronous.

7. A procedure as claimed in claim 5, wherein the timing different is known by the second base station because the first and second base stations operate as part of a network which is entirely synchronous.

8. A procedure for the handover of a radio connection to a mobile radio station from a first base station to a second base station in a Time Division Multiple Access (TDMA) cellular radio communications network having a controller coupled to the first base station and also to the second base station, the procedure comprising:

transmitting from the controller to the second base station identification information regarding the mobile station, the identification information including frequency channel information enabling tuning of the second base station to a channel in which the mobile station shall transmit;

transmitting from the controller, through the first base station, a handover command to the mobile station that does not include information describing timing characteristics of the second base station;

in response to the mobile station establishing communication with the second base station, correcting with a channel equalizer for any deviation in signal timing caused by a change in timing during handover; and initiating trafficking with the mobile station immediately after the mobile station moves to the new channel as a result of the handover.

9. A method for accomplishing a handover of a radio connection of a mobile station from a first base station to a second base station in a Time Division Multiple Access (TDMA) cellular radio communications network having a controller coupled to the first base station and also to the second base station, the method comprising the steps of:

transmitting from the controller to the second base station identification information regarding the mobile station, the identification information including (a) information that uniquely identifies the mobile station; (b) information that identifies an assigned radio frequency channel to be used for communication with the mobile station; and (c) information that identifies a portion of a TDMA frame to be used in communicating with the mobile station;

transmitting from the controller, through the first base station, a handover command to the mobile station, the handover command including (a) information that identifies the assigned radio frequency channel to be used for communication with the second base station; and (b) the information that identifies the portion of a TDMA frame to be used in communicating with the second base station; and in response to the mobile station establishing communication with the second base station in accordance with the information included within the handover command, operating a channel equalizer of at least the mobile station to (a) correct for any received symbol time dispersion errors that result from the use of the assigned radio frequency channel, and to (b) correct for any received symbol time dispersion errors that result from any deviation in signal timing caused by any change in timing characteristics from the first base station to the second base station, wherein a maximum received symbol time dispersion that is correctable by the channel equalizer is selected to equal or exceed a sum of (a) a maximum allowable received symbol time dispersion that can occur as a result of handing over the mobile station and (b) a maximum received symbol time dispersion that can result from the use of an assigned radio frequency channel.

* * * * *